US012364938B2

(12) United States Patent
Root et al.

(10) Patent No.: US 12,364,938 B2
(45) Date of Patent: Jul. 22, 2025

(54) MICROPLASTIC EFFLUENT SEPARATOR WITH WASH APPARATUS

(71) Applicant: INHERITING EARTH LIMITED, Bristol (GB)

(72) Inventors: Adam Root, Bristol (GB); Reuben Kettle Aiers, Bristol (GB); Thomas Ruddell, Bristol (GB); Reuben D'Orton-Gibson, Bristol (GB)

(73) Assignee: Inheriting Earth Limited, Bristol (GB)

( * ) Notice: Subject to any disclaimer, the term of this patent is extended or adjusted under 35 U.S.C. 154(b) by 261 days.

(21) Appl. No.: 17/754,650

(22) PCT Filed: Oct. 8, 2020

(86) PCT No.: PCT/IB2020/059455
§ 371 (c)(1),
(2) Date: Apr. 7, 2022

(87) PCT Pub. No.: WO2021/070103
PCT Pub. Date: Apr. 15, 2021

(65) Prior Publication Data
US 2023/0330568 A1 Oct. 19, 2023

(30) Foreign Application Priority Data
Oct. 8, 2019 (GB) ..................................... 1914548

(51) Int. Cl.
*B01D 29/15* (2006.01)
*B01D 29/58* (2006.01)
(Continued)

(52) U.S. Cl.
CPC ......... *B01D 29/6438* (2013.01); *B01D 29/15* (2013.01); *B01D 29/58* (2013.01);
(Continued)

(58) Field of Classification Search
CPC ........ A47L 11/00; A47L 11/32; A47L 11/325; A47L 11/34; A47L 11/40; A47L 11/4013; A47L 11/4025; A47L 11/4027; A47L 11/4033; A47L 13/00; A47L 13/10; A47L 15/00; A47L 15/4202; A47L 15/4206; A47L 15/4208; D06L 1/20; D06L 4/70; D06L 4/75; D06F 1/00; D06F 1/12; D06F 21/00; D06F 23/00; D06F 25/00; D06F 29/00; D06F 34/00; D06F 39/10; D06F 39/20; D06F 39/08; D06F 39/081;
(Continued)

(56) References Cited

U.S. PATENT DOCUMENTS 7,297,265 B1 * 11/2007 Booth ................. B01D 29/688
210/411
2014/0298590 A1 * 10/2014 Fulmer .................. D06F 39/10
68/18 F

* cited by examiner

*Primary Examiner* — Allison G Fitzsimmons
(74) *Attorney, Agent, or Firm* — Schott, P.C.

(57) ABSTRACT

The invention relates to preventing microplastics from the entering the environment. In particular the invention is directed to regenerating the efficiency of filters for removing microfibers from washing machine waste water, as well as waste from other appliances and other sources of effluent with entrained microplastics. A separator is therefore provided for separating microplastics from waste water comprising a chamber with an inlet and an outlet, at least one sieve structure forming a permeable barrier between the inlet and the outlet and a wash apparatus for washing the sieve structure.

14 Claims, 14 Drawing Sheets

(51) Int. Cl.
  *B01D 29/64* (2006.01)
  *B01D 29/68* (2006.01)
  *B01D 29/90* (2006.01)
  *B01D 29/94* (2006.01)
  *B01D 35/157* (2006.01)
  *D06F 39/10* (2006.01)

(52) U.S. Cl.
  CPC ........... *B01D 29/68* (2013.01); *B01D 29/908* (2013.01); *B01D 29/94* (2013.01); *B01D 35/157* (2013.01); *D06F 39/10* (2013.01)

(58) Field of Classification Search
  CPC ....... D06F 39/083; D06F 41/00; B01D 29/00; B01D 29/0097; B01D 29/11; B01D 29/114; B01D 29/62; B01D 29/66; B01D 29/68; B01D 29/64; B01D 29/6438; B01D 29/88; B01D 29/92; B01D 29/94; B01D 39/10; B01D 39/12; B07B 1/00
  USPC ........ 68/18 F, 208, 5 C, 53, 12.13, 17 R, 20, 68/184, 18, 207, 58, 12.02, 12.18, 134, 68/13 R, 19.1, 210, 23.4, 23.5, 24, 12.05, 68/12.06, 12.12, 12, 14, 133, 1, 40, 15, 68/16, 17, 19.2, 196, 212, 23.7, 3, 5; 210/167.01, 238, 497.01, 136, 196, 346, 210/409, 232, 411, 435, 451, 460, 162, 210/310, 380.2, 403, 437, 444, 454, 456, 210/94, 791, 167.25, 171, 248, 284, 356, 210/357, 433.1, 150, 453, 455, 463, 47, 210/473, 474, 477, 483, 484, 485, 497.2, 210/500.1, 636, 104.4, 111, 104.1, 153, 210/93; 34/596; 134/115 R, 56 D, 148, 134/165, 58 D, 111, 153, 157, 57 D, 10, 134/131, 152, 25.2, 58 R, 72, 94.1, 1.1, 134/103.2, 104.1, 104.3, 104.4, 109, 134/115 G, 112 R, 134, 144, 15, 155, 134/176, 180, 183, 184, 186, 191, 198, 134/199, 20, 200, 25.1, 32, 34, 57 R, 61, 134/63, 64 R, 68, 902; 209/10, 173, 273; 162/251, 55, 56, 60; 101/425
  See application file for complete search history.

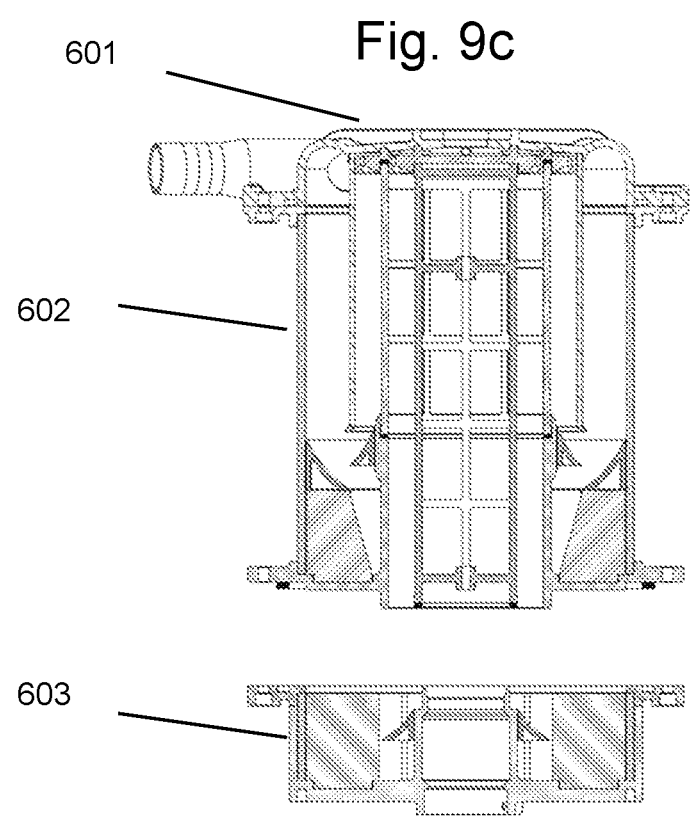

MICROPLASTIC EFFLUENT SEPARATOR WITH WASH APPARATUS

BACKGROUND

Field of the Invention

The invention relates to preventing microplastics from entering the environment. In particular the invention is directed to regenerating the pressure consumption of filters for removing microplastics in effluent from any source but in particular removing microfibers from washing machine wastewater. It is also suited to filtering microfibers from the effluent from commercial scale washing machines and textile manufacturing processes. It is also suited to filtering microplastics and micropollutants from other effluent such as the runoff from roadside gullies.

Description of Related Art

Microfibres are the most abundant form of microplastic pollution in rivers and oceans. Due to their microscopic scale, microfibers are eaten by organisms at all levels of the food chain, from plankton to top predators. Once ingested, plastics reduce feeding efficiency (false satiation) they may damage the gut of the animal and transfer harmful additives like PCBs, pesticides, flame retardants to the animal that consumed it. Plastics consumed by animals low in the food chain also impact their predators, which consume numerous contaminated prey daily. The pervasiveness of microfibers in the food chain has naturally resulted in concern regarding their transfer to humans, and contamination has been observed in crustaceans, molluscs and fish species destined for human consumption.

Unlike microbeads, which are easily excluded from toiletries and cleaning products, microfibres are formed through damage to clothing. One third of all microplastics in the oceans come from washing of synthetic textiles. Synthetic fabrics derived from petrochemicals make up 65% of all textiles. Wear and tear caused by abrasive forces in washing machines and textile manufacture processes result in the fragmentation of man-made textiles, forming hundreds of thousands of microfibres, less than 5 mm in length, which leak from homes and drainage networks into the ocean.

Wastewater treatment plants cannot remove the millions of fibres that pass through them every day. Currently, secondary level water treatment removes around 98% of the microplastics that pass through them. However, the small proportion that escapes still equates to tens of millions of fibres per treatment works per day.

Furthermore, wastewater treatment plants produce a "sewage sludge" and plastic microfibers are found on discharge when released into the natural environment when the sludge is spread on agricultural land, thus microfibers make their way into the food chain, waste to energy (which can destroy fibres but release harmful gasses) or discharged into rivers or the ocean.

Current washing machine filters are designed to stop pennies and buttons breaking the washing machine pump. The filtration required to stop microfibres is less than 50 micrometers (um), which is about the width of a human hair.

It is known to provide mesh filters that stop the problem at source. However, mesh filters clog up quickly and when this happens their effectiveness drops off considerably. This causes the pressure to drop and the flow rate to reduce, which can lead to damage to pumps and other elements of the system and flooding.

Washing machines are found in domestic and commercial settings.

A typical domestic washing machine is shown in FIG. 1 in schematic form. The machine 100 includes a rotatable sealed drum unit 101 for receiving garments to be washed. The sealed drum unit 101 has a perforated cylindrical rotatable drum mounted inside a static waterproof shroud. Clean water is fed into the drum 101 via a cold water inlet 102 connected to mains and under mains pressure of typically 1 bar. The water entering the drum 101 is managed by an electronic valve, under the control of a CPU 104. The inlet 102 is connected to a drawer 105 where liquid or powdered detergent can be added by a user. The drawer has an outlet that leads to the drum unit 101. The drum unit may include a heater under the control of the CPU to heat the water to the desired wash temperature, typically up to 90 degrees Celsius. The drum is rotatable by an electric motor 106 under the control of the CPU 104 at speeds of typically from 5 to 1600 rpm. The drum unit can be emptied via an outlet having an electronically operated drain valve 107 and a drain pump 108 both controlled by the CPU. The drain pump is rated with a given power to produce a known pressure at its output. The drain pump feeds into an outlet 109 which is connected to the household or industrial drain and eventually the wastewater network.

In use, dirty laundry is placed in the drum, and a wash cycle initiated by a user. The CPU allows cold water to flow via the drawer to mix with detergent and then on into the drum, where the water is heated. The combined water, detergent and laundry is agitated by rotating the drum. During this process, dirt and grease is released into the water and fibres from the clothing too. If the clothing is synthetic, microfibers are typically released as the clothes rub against each other. The resulting effluent at the end of the wash cycle is a mixture of debris, dirt, grease and microfibers and potentially large objects such as coins or nails left in the clothing. This effluent is then drained and pumped out of the drum at a typical rate of 2 gallons per minute. Second or third rinse cycles with clean water may be performed, resulting in effluent with less concentrated contaminants.

In a typical wash, the highest concentration of microfibers is in the range 5 mm to 150 um but shorter microfibers exist that are still harmful in the environment. If it were required to remove 99% of microfibers of all sizes down to 50 um in length, a mesh with apertures of 50 um would theoretically be able to achieve this. In practice however, such a mesh placed directly in the stream of effluent will clog almost immediately and the filter will become inoperable. This will create a rise in pressure consumption in the outlet and potentially damage the pump.

FIG. 2a shows a conventional arrangement 200 for separating microfibers from washing machine effluent, that has a cylindrical chamber 201 with an inlet 202a at an upper end "U" and an outlet 202b at a lower end "L". A cylindrical mesh structure 203 is located within the chamber 201 presenting a permeable barrier between the inlet and the outlet. In use, as the effluent fills the chamber, particles are filtered out and remain stuck to the outside of the mesh, increasing the power consumption and lowering the efficacy of the filter as the mesh starts to clog.

Curve 1 in FIG. 3 is a measure of the effectiveness of the arrangement shown in FIG. 2, given a constant flow of dirty water, with a consistent contamination level. The y-axis represents the fluid pressure, P, at the inlet 201 and it can be seen to rise gradually, then exponentially as the mesh becomes blinded over with filtrate.

In practice, the flow of effluent from a washing machine is not constant over time because a limited amount of water is used in each wash cycle. Curve 2 in FIG. 3 shows how the inlet pressure varies over time where the flow of effluent stops, drains through the device and then starts again. Reductions in the pressure can be seen, as the flow stops and debris previously held against the mesh by the pressure of the flow falls away, revealing pores that allow fluid to flow through again, until they become re-blocked in the next cycle. Curve 2 demonstrates that the pressure consumption required by the conventional device increases through use, so the inlet pressure required to filter effluent eventually becomes greater than the pump is able to provide.

It is necessary to open this device and clean the mesh by hand to return its pressure consumption back to a level for it to operate effectively, i.e. to regenerate its pressure consumption. This is a tedious and messy process. The present invention therefore seeks to overcome the problem of regenerating the pressure consumption of mesh filters used for separating microplastics from a flow of effluent.

The present invention seeks to provide effective filter regeneration for removing microfibers directly from the effluent of both commercial and domestic washing machines and other appliances and also industrial textile manufacturing facilities. It is not limited to this application and could be used to remove microplastics and other micropollutants from other sources of contaminated effluent such as the runoff from roadside gullies.

SUMMARY OF THE INVENTION

In an embodiment, a separator for separating microplastics from an effluent comprising a chamber with an inlet and an outlet, a sieve structure forming a permeable barrier between the inlet and the outlet and a wash apparatus for washing the sieve structure, wherein the sieve structure includes a first mesh within the chamber, such that there is a cavity between the inner wall of the chamber and the sieve structure and wherein the wash apparatus includes a channel connected to a first set of fixed guides located around an end of the first mesh for directing wash fluid over the first mesh.

The sieve structure may include a second mesh within the chamber.

The channel may be connected to a second set of fixed guides located around an end of the second mesh for directing wash fluid over the second mesh. The guides may be slots or nozzles. The chamber and/or the first mesh and/or the second mesh may be cylindrical. The cylindrical meshes may be concentric. The guides may be arranged in a ring around the meshes. The slots may be curved to form a ring. The nozzles may be spaced apart in a ring.

The guides may be provided in a cap located at one end of the first and second meshes.

The cap may be located at an upper end of the first and second meshes.

The separator may include a chamber arranged to feed the wash fluid to the guides. The channel may include a stream splitter for splitting the flow of wash fluid between the first and second guides. The channel may include a valve for controlling the flow of wash fluid between the first guides and the second guides. The channel may include a one-way valve structure arranged to allow the flow of wash fluid onto the meshes but prevent flow of fluid back into the wash fluid channel.

The inlet conduit may be connected tangentially to the circular portion of the chamber. The chamber may further include a vortex finder comprising a shroud having a circular portion extending down into the chamber. The second mesh may have a smaller opening size than the first mesh.

The outlet may be at the lower end of the chamber. The shroud, the first mesh and the second mesh may be cylindrical and coaxially aligned. The chamber may further include a baffle that is coaxial with the shroud and projecting upwards from the lower end of the chamber, wherein the shroud may have a circular lower rim and the baffle a circular upper rim, wherein the radius of the lower rim of the shroud may be greater than the radius of the upper rim of the baffle.

The outlet may be at the upper end of the chamber. The shroud may be frustoconical. The first mesh and the second mesh may be conical and coaxial with the shroud.

The mesh size of the first mesh may be in the range 20 um to 1 cm, preferably in the range 200-500 um. The mesh size of the second mesh may be in the range 20 to 200 um, preferably in the range 40-90 um.

The chamber may have an upper turbulent region and a lower static region separated by at least one baffle. A pair of opposing offset ring baffles may separate the turbulent region from the static region. Fins may be provided in the static region for slowing the radial flow of effluent.

A first sump may be provided below the first mesh in the static region and a second sump may be provided below the second mesh in the static region, wherein the first and second sumps are isolated from each other by the first sieve structure.

A removable lid and plug assembly may be provided for emptying the sumps. The end of the separator may be removable for emptying the sumps.

The outlet may be at the lower end or the upper end of the chamber.

A sensor for detecting fluid pressure at the inlet may be provided. The separator may include a wash fluid valve for controlling the flow of wash fluid into the inlet. The sensor may be arranged to detect when the flow of effluent has ceased or reduced beyond a threshold and to send a signal capable of opening the wash fluid valve.

The sensor may be arranged to communicate with a warning system, such that, in use, if the fluid pressure measured by the sensor rises above a first threshold, a warning signal is issued that the separator needs cleaning.

The separator may further include a bypass duct between the inlet and the outlet, wherein the bypass duct is engaged by operation of a bypass valve. The sensor may be arranged to operate the bypass valve if, in use, the fluid pressure measured by the sensor rises above a second threshold, indicating that there is a blockage in the chamber of the separator.

The bypass valve may be passive and arranged to open when the pressure reaches a threshold value.

A water purification element may be included to further filter the wastewater. The water purification element may include activated charcoal within the second mesh. The second mesh may include a coaxial wall within the second mesh and the cavity between these two structures is filled with activated carbon. A secondary pump may be included to provide enough pressure to the wastewater to urge it through the water purification element.

In an embodiment, a washing machine or other appliance is provided including a separator of the type described above. The appliance may be industrial textile manufacturing equipment.

The separator may be for use in a drainage system.

In an embodiment, a drain including a separator of the type described above may be provided.

In an embodiment, a method of operating a separator of the type described above is provided, comprising the steps of:
receiving a flow of effluent;
passing the effluent through at least one sieve stage;
washing the sieve with a fluid.

The method may further comprise the steps of:
passing the effluent through a cyclonic separation stage;
passing the effluent through a first sieve stage;
passing the effluent through at least one sieve stage.

The method may comprise the steps of passing the effluent through a first sieve stage,
passing the effluent through a second sieve stage, where the second sieve pore size is less than the pore size of the first sieve stage;
collecting the debris separated from the effluent by the cyclonic separation and first and second sieve stages.

The method may further involve sequentially washing the first and second sieve stages with a fluid.

The method may be used to treat wastewater from industrial textile manufacturing equipment. The method may be used to treat wastewater from a roadside drain.

BRIEF DESCRIPTION OF THE DRAWINGS

Embodiments of the present invention are described below, by way of example only, with reference to the accompanying drawings, in which:

FIG. 6b is a cross section of the embodiment shown in FIG. 6a.

FIG. 7d shows a perspective view of the cap of the separator of FIG. 6a.

FIG. 7e shows a perspective view of the end cup of the separator of FIG. 6a.

FIGS. 8a to 8c show a cap of the embodiment of FIG. 6a.

FIG. 9c shows a first stage of an embodiment removed for emptying.

DETAILED DESCRIPTION OF THE PREFERRED EMBODIMENT

While the description that follows focuses on washing machines for clothes, it is to be understood that the teachings herein are not limited to use in washing machines as they are equally suited to other processing appliances, such as but not limited to driers, such as tumble driers, dyeing machines, cutting machines, recycling machines, dry cleaning machines and so on. The teachings herein could also be used in other industries in which microparticles may be generated as a result of processing of items, for example equipment for use in the industrial manufacture of textiles. References to washing machines herein are therefore to be understood as comprising any similar appliance of the types contemplated herein.

It will further be appreciated that the teachings herein are suited to any application which requires the removal of microplastics, including microfibers, or other micropollutants from any effluent, including wastewater, within which such materials may be entrained. For example, for capturing the solid components entrained in the runoff from roadside gullies, as discussed in more detail below.

Figure 1:
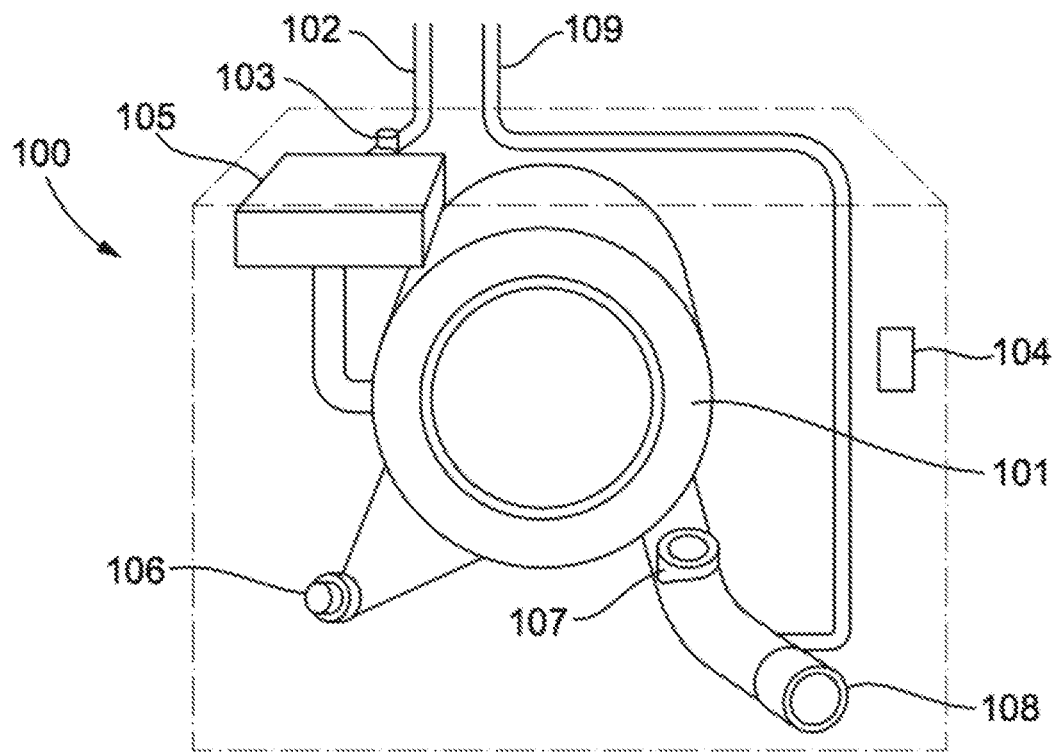
FIG. 1 is a view of the internal workings of a standard washing machine.
Figure 2A:
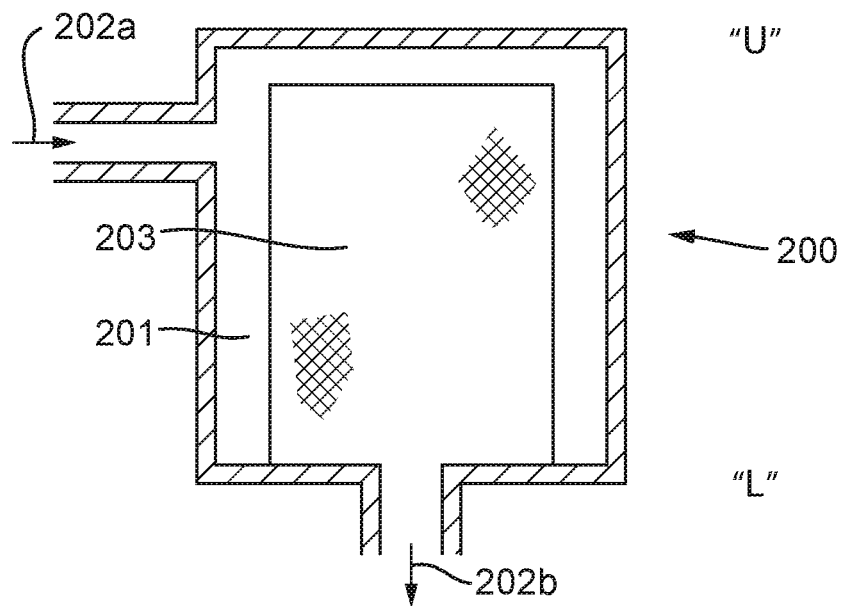
FIG. 2a is a cross section of a conventional mesh filter.
Figure 2B:
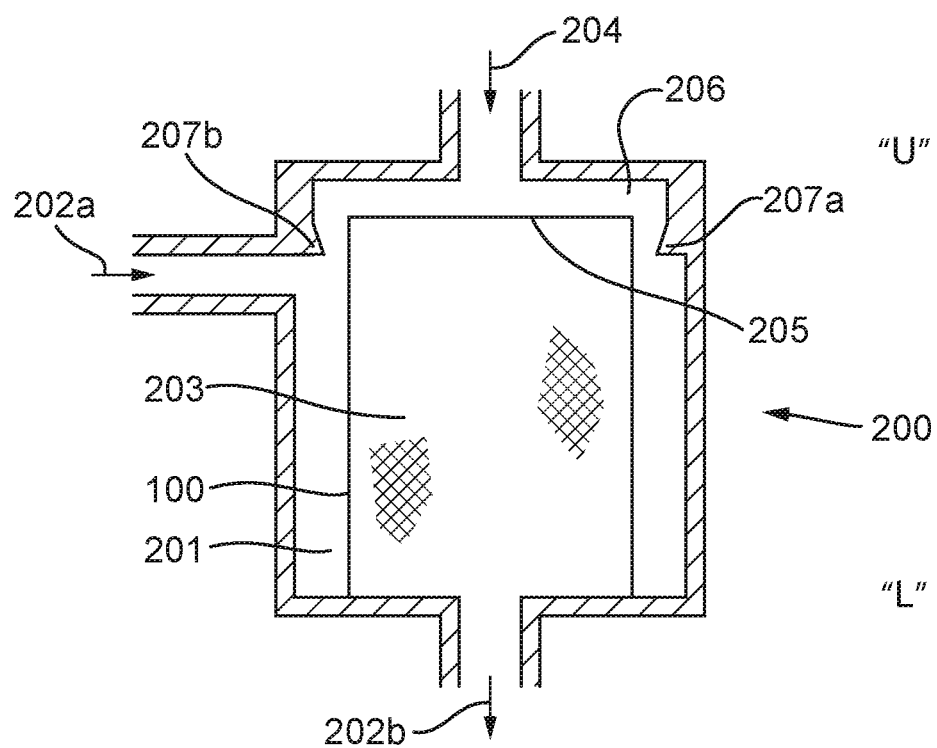
FIG. 2b is a cross section of a filter in accordance with an embodiment of the invention.

FIG. 2b shows an embodiment of the invention having a feature for regenerating the pressure consumption, i.e. the efficacy of the filter. Filter efficacy is its effectiveness at removing debris of a given size range while maintaining an acceptable flow rate and is closely related to the filter's pressure consumption. As a filter becomes blinded over by debris, its pressure consumption increases, and its efficacy decreases. The embodiment of the invention described below regenerates the pressure consumption of a filter back to the level, or close to the level, of when it was new. A separator 200 for separating microfibers from washing machine effluent is provided having a cylindrical chamber 201 with an effluent inlet 202a at an upper end "U" and an outlet 202b at a lower end "L". A cylindrical mesh structure 203 with a pore size of 80 um, although a mesh with pore sizes in the range 20-200 um may be used, is located within the chamber 201 presenting a permeable barrier between the inlet and the outlet. The mesh structure 203 has a deflector 205 at its upper end. The deflector is a disk for deflecting wash water and distributing it outwards to its edges. A wash water inlet 204 is located at the upper end of the chamber 200. There is a clearance 206 between the deflector 205 of the mesh structure 203 and the top of the chamber, which provides a path for wash water to enter the chamber. Wash fluid guides 207a,b are located around the edge of the upper part of the chamber to direct the wash water onto the mesh surface. The guides are arranged to spray the surface of the mesh with mains pressure clean water. The guides are inwardly projecting circular flanges with a tapered funnel shape. Alternatively, any fluid may be used to wash the surface of the mesh, including water containing functional additives.

Figure 4:
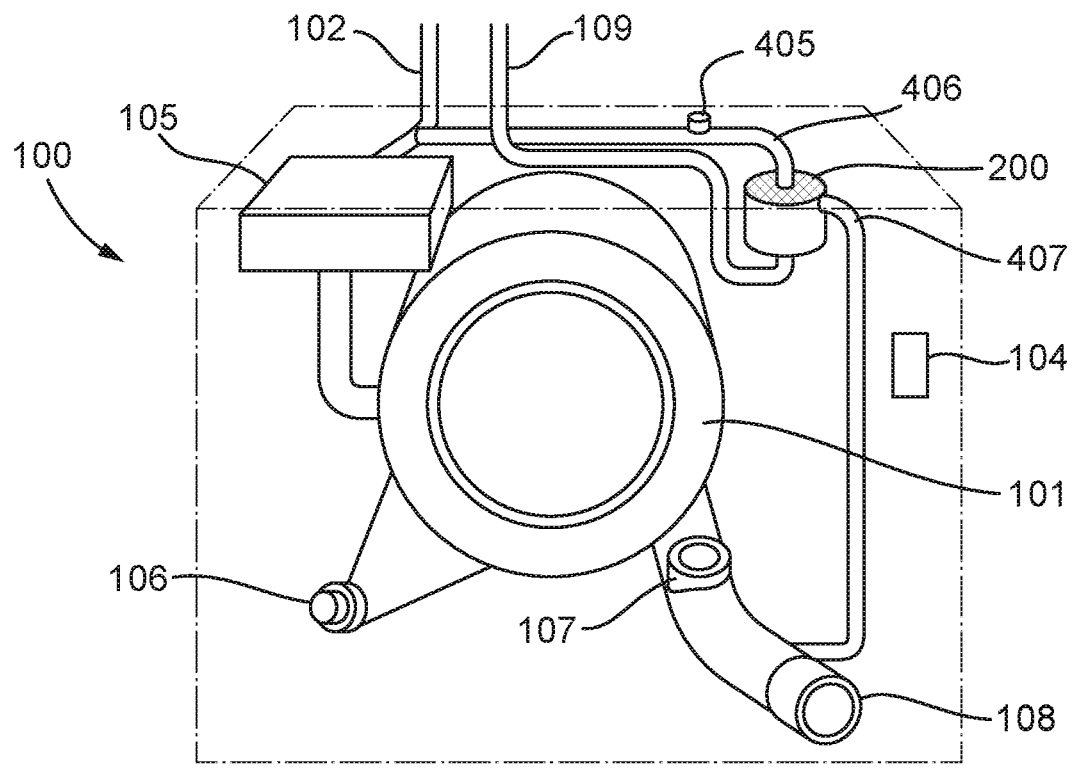
FIG. 4 is a view of the internal workings of a washing machine fitted with an embodiment of the invention.

The separator device 200 is located within a washing machine. It is connected to the supply of clean mains pressure water of approximately 2 bar or greater (although this can vary depending on geographical location) which enters the washing machine at the inlet 102, as shown in FIG. 4, via a solenoid controlled valve 405. A pressure sensor 407 is located near the effluent inlet 201 to detect when a wash cycle has finished and the mesh is ready to be washed. Alternatively the solenoid valve 405 can be controlled directly by the CPU 104 when the wash cycle ends and the pump 108 has finished draining the drum 101.

In use, when the wash cycle finishes, the CPU opens the drain valve 107 and starts the drain pump 108. This fills the chamber 201 of the separator 200 with dirty effluent, which is sieved through the mesh 203 and drains out of outlet 202b and out of the machine into the sewerage system. Gradually the dirt builds up on the outside of the mesh. When the drum is fully drained, the sensor 407 detects the drop in pressure of effluent and sends a signal to the CPU 104 to activate the wash valve 405. Mains water then passes through conduit 406 and into the top of the separator 200 so as to impinge on the deflector 405 and the fluid guides 207a, b thereby to rinse off the debris that has accumulated on the outer surface of the mesh. The CPU 104 then instructs the wash valve 405 to close again after approximately 2 seconds and the rinsing water drains through the mesh and rinsed debris settles to the bottom of the chamber 201. The filter washing stage can last for less than or more than 2 seconds; for example it may last for a minute if the filter is heavily clogged.

Figure 3:
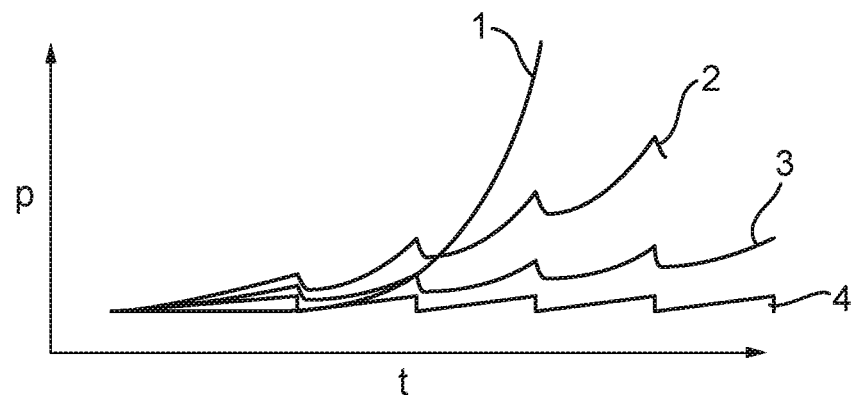
FIG. 3 is a chart showing variations in pressure for different filter set-ups.

This process is repeated for subsequent wash cycles. However, the settled debris will be re-entrained into the effluent on the next cycle and there will subsequently be a greater density of particles adhering to the mesh. This will have the effect of gradually reducing the efficacy of the filter unit, as illustrated by Curve 3 in FIG. 3. The pressure at the inlet gradually rises during a wash cycle and then drops upon rinsing, but it does not drop all the way back to zero. The pressure consumption, and therefore energy consumption, will gradually increase until the pump cannot deliver the required pressure any more.

Figure 5:
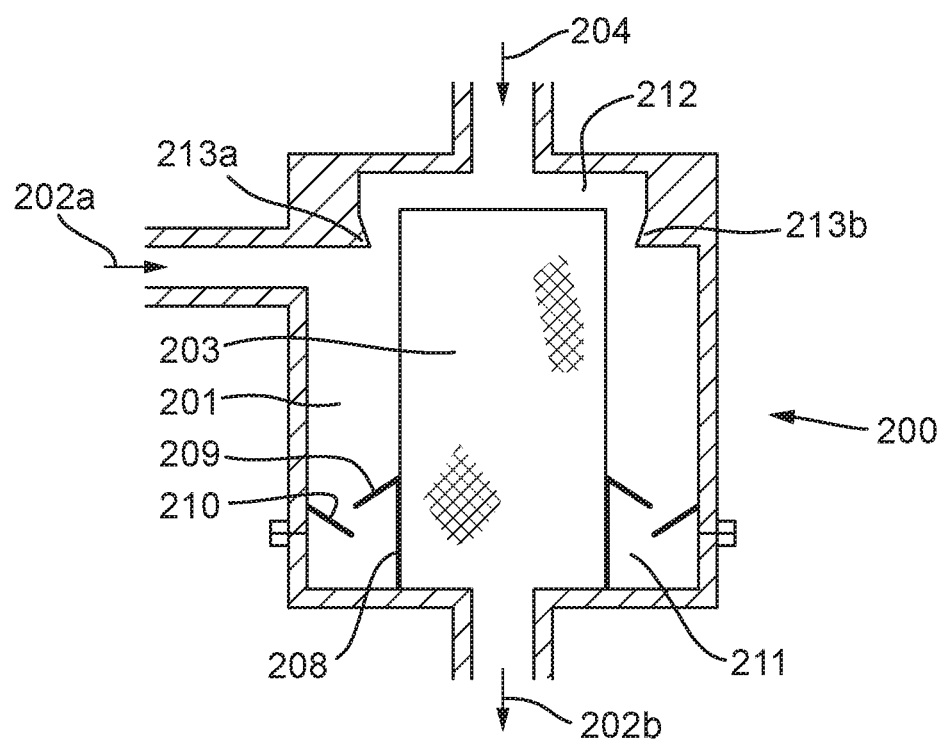
FIG. 5 is a cross section of a filter in accordance with a further embodiment of the invention.

In another embodiment of the invention, a sump system is provided to collect the debris rinsed from the mesh, as shown in FIG. 5. A separator unit 200 has a chamber 201 with an inlet 202a at an upper end and an outlet 202b at a lower end. A cylindrical mesh structure 203 is located within the chamber 201, supported by an inner cylindrical wall 208. The inner cylindrical wall and inner wall of the chamber support a pair of opposing offset ring baffles 209, 210 that define a lower static sump region 211. Vertical fins can be provided in the lower static sump region to reduce the rotation of fluid in the sump to prevent re-entrainment of debris. A wash fluid inlet 204 connects to a channel 212 that can deliver wash fluid into the chamber 201 via fluid guides 213a, b and onto the outer surface of the mesh. The separator is installed in a washing machine with a wash fluid inlet valve controlled by the CPU. In use, when the wash cycle finishes and the drum is drained, the CPU activates the wash fluid inlet valve and the mesh is rinsed with clean mains water. Debris is washed from the outside of the mesh and sinks to the bottom of the chamber, past the ring baffles 209, 210 into the sump. A removable base can be provided on the sump to empty it.

In a typical wash, the highest concentration of microfibers is in the range 5 mm to 150 um but shorter microfibers exist that are still harmful in the environment. If it were required to remove 99% of microfibers of all sizes down to 50 um in length, a mesh with apertures of 50 um would theoretically be able to achieve this. In practice however, such a mesh placed directly in the stream of effluent will clog almost immediately and the filter will become inoperable. This will create a rise in pressure in the outlet and potentially damage the pump and/or cause the washing machine to overflow and flood the home.

Figure 6A:
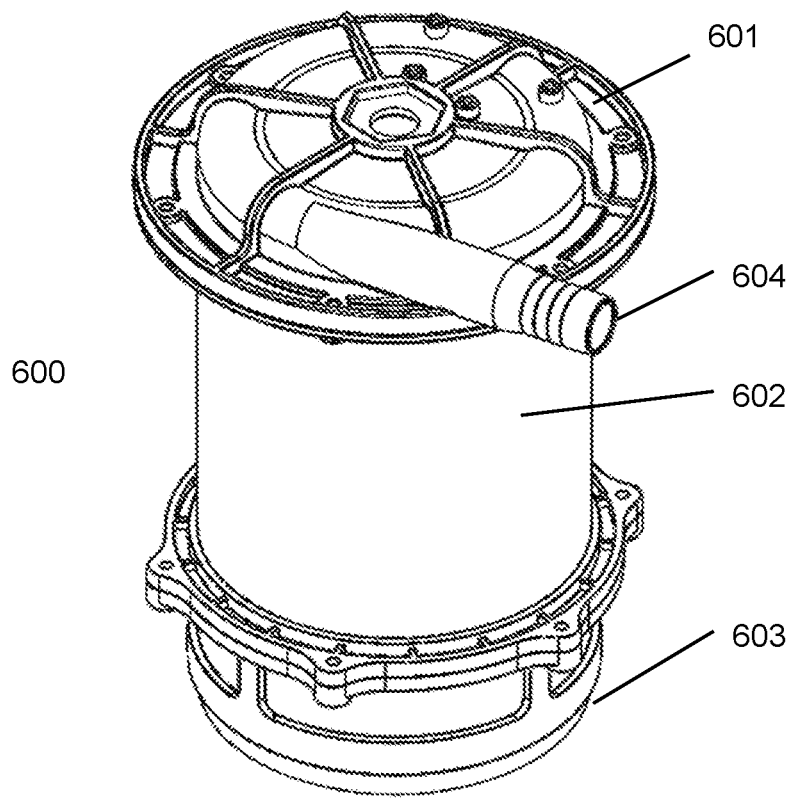
FIG. 6a is a perspective view of a further embodiment of the invention.
Figure 6B:
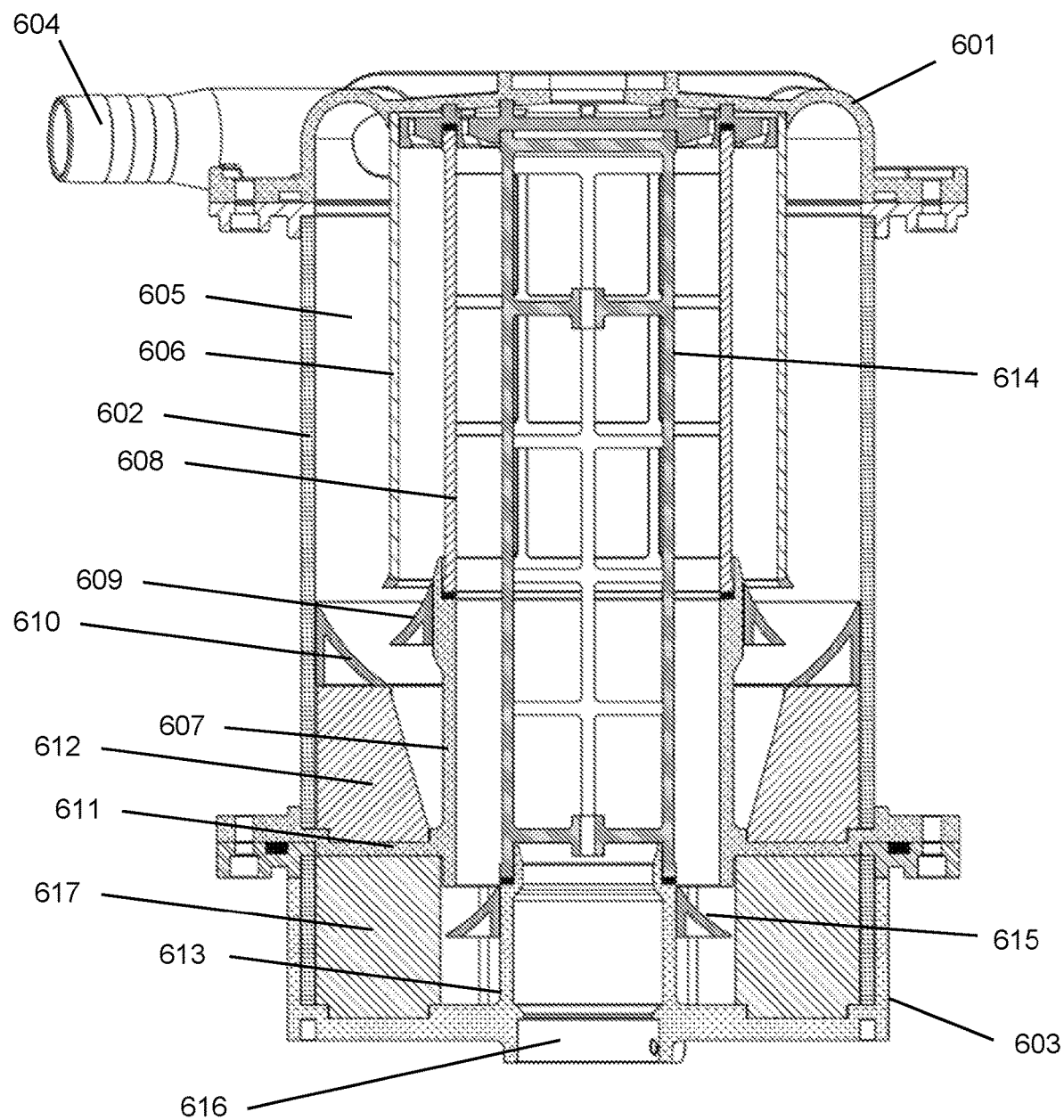

In an embodiment of the invention the problem is solved by providing a three-stage filter assembly for removing progressively finer sized debris, as shown in FIGS. 6a and b. The filter assembly is installed downstream from the pump 108 and before the outlet 109.

The separator unit 600 comprises three major parts; a cap 601, a body section 602 and a lower sump section 603. The cap 601 includes an inlet 604 that feeds into a circular channel that imparts a rotational flow to the incoming effluent. The body 602 includes a toroidal chamber 605 defined by the outer walls of the body 602 and a shroud 606 that acts as a vortex finder. The shroud is fixed to the cap 601. A tubular first mesh support structure 607 of lesser radius than the shroud 606 supports a first cylindrical mesh 608 of pore size 400 um, but could be in the range 200 to 500 um, or even 20 um to 1 cm which meets a gasket at the top where it joins the cap 601. The first mesh support structure 607 also supports a skirt 609 which guides the flow of effluent up behind the shroud 606 and also helps to prevent fallen debris returning into the chamber 605.

The shortest distance between the rim of the shroud 606 and the skirt 609 is tuned to suit the required pressure consumption. This tuning is a balance between a relatively narrow gap to create a high fluid velocity so that debris separates from the flow, and a wide gap that does not put too much demand on the pump. A suitable separation distance for a flow rate of 10 litres per minute is 1 cm, but it could be more or less than this depending on the proportions of other elements of the device and the pump specification.

In the region of the skirt 609, the wall of the body 602 supports a deflector ring 610 that forms a lip to guide debris further down into the separator. The skirt and deflector ring form a pair of opposing offset ring baffles to prevent re-entrainment of debris. The first mesh support structure 607 itself has a broad flange 611 that reaches to the wall of the body 602 to which it is attached. The wall, flange and support structure together form a first sump 612 for collecting debris. The skirt 609 and deflector ring 610, i.e. the opposing offset ring baffles, together form an "eel trap" which prevents debris from coming back out of the sump. The first sump includes vertical radial vanes to arrest the circular fluid flow and reduce the amount of sediment being re-entrained in the effluent.

The lower sump comprises an end cup 603 fixed to the bottom of the body 602. Centrally located within the cup is a second mesh support structure 613 that supports a second cylindrical mesh 614 of pore size 80 um, but could be in the range 40 to 90 um, or even 20 um to 200 um that rises to join the cap 601 at a gasket. At the base of the second mesh 614 is a second skirt 615 that can deflect debris into the lower sump 603. At the lower end of the second mesh support structure 613 is an outlet 616.

Figure 7A:
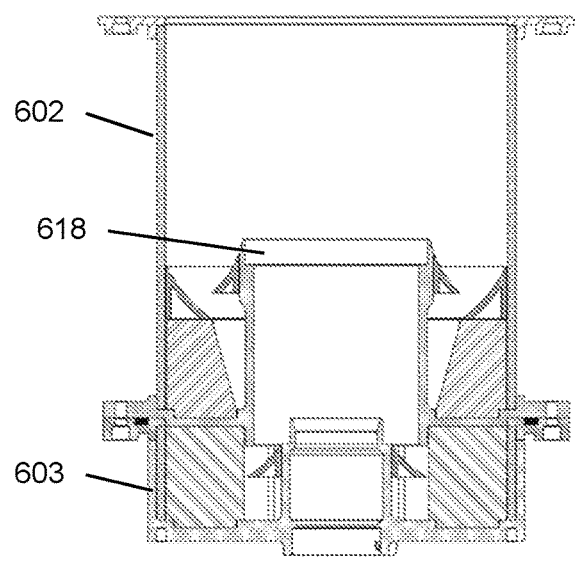
FIGS. 7a to 7c are cross sections of the embodiment shown in FIG. 6a being dismantled.
Figure 7B:
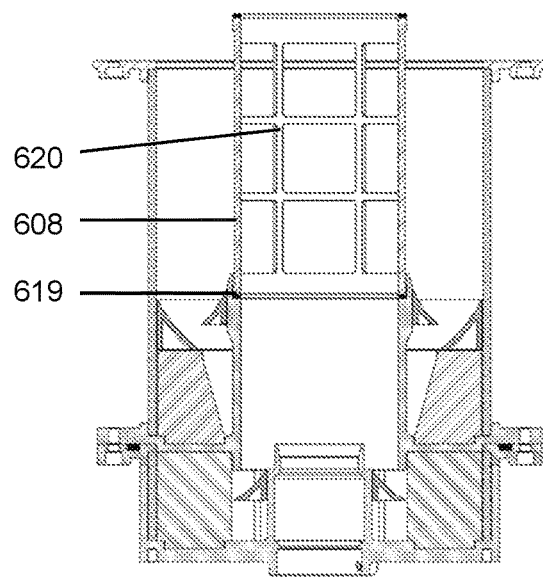
Figure 7C:
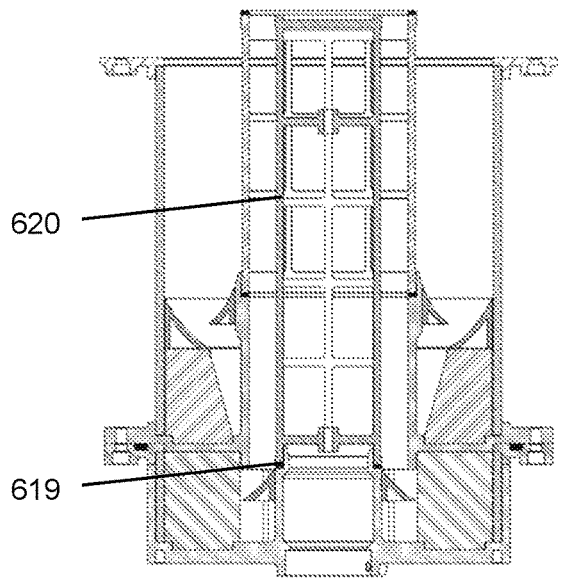
Figure 7D:
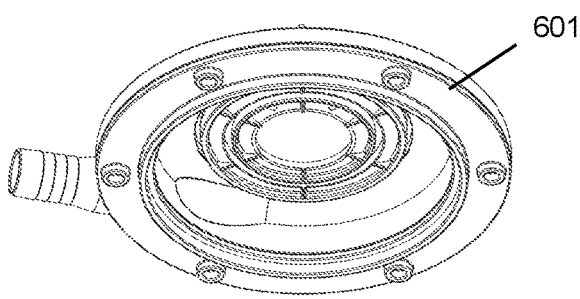
Figure 7E:
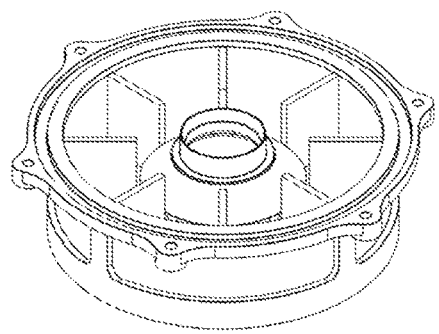

FIGS. 7a to 7c show the stages of assembly of the mesh structures of the separator 600. FIG. 7a shows the body 602 and lower sump 603 pre-assembled, with the cap 601 removed. The first mesh support structure 607 has a recessed lip 618 for receiving the first mesh 608, and the first mesh is shown in place in FIG. 7b, with a gasket 619 between the two components. The mesh itself is flexible and is therefore mounted on a stiff lattice from 620. In the diagrams, the fine detail of the mesh is not shown, but the lattice frame 620 to which the mesh is bonded is shown. Other ways of fixing the mesh to the lattice frame are possible, such as overmoulding. The narrower second mesh 614 mounted on its own stiff lattice 620 is then located onto the second mesh support structure 613 with a gasket between the two components. The cap 601 is then installed and seals the unit allowing fluid access only via the inlet 604 to the outlet 616. The cap also isolates the internal regions from each other, so that effluent can only pass through the mesh structures on its journey from inlet to outlet.

Figure 8A:
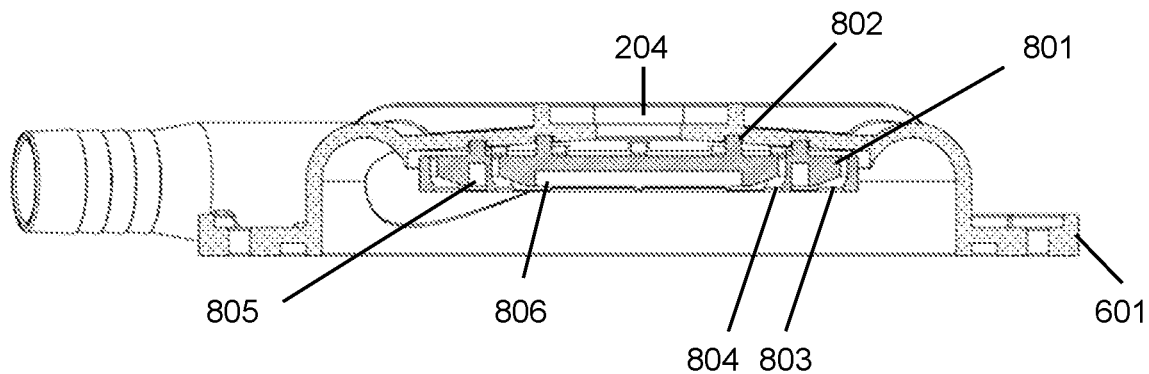
Figure 8B:
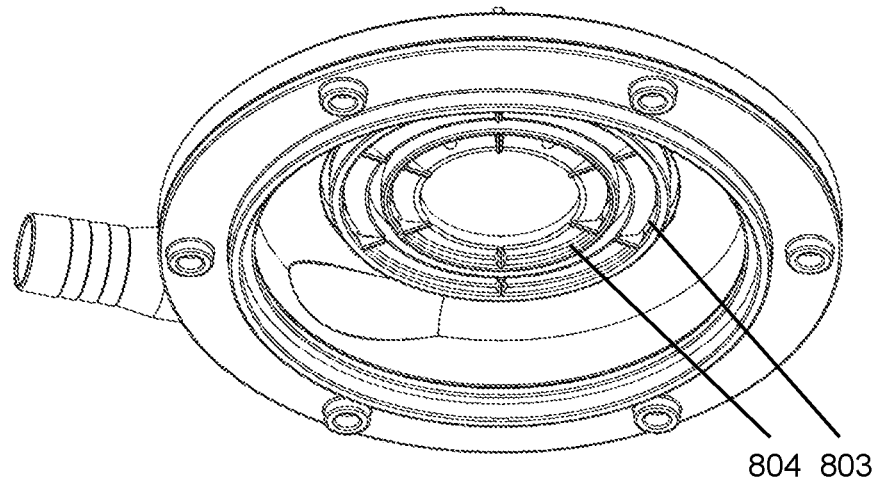
Figure 8C:
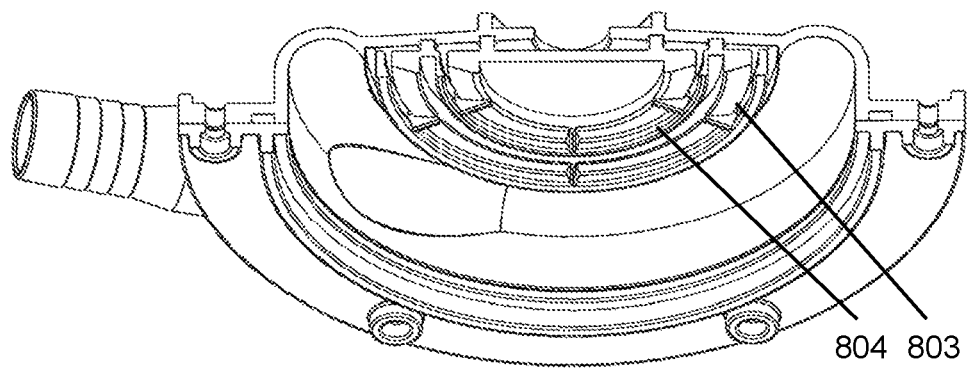

In this embodiment, the cap 601 includes a mesh washing arrangement. This is shown in more detail in FIGS. 8a to 8c. The cap 601 has a wash channel insert 801 that comprises a disk having an upper surface and a lower surface and perforating slots between the two surfaces. The upper surface of the insert 801 includes a series of spacers 802 that locate within recesses in the cap 601 and separate the insert 801 a distance from the underside of the cap, such that when the insert 801 is fixed into the cap, a network of channels join the wash fluid inlet 204. The insert 801 has two concentric rings of slots; inner slots 804 and outer slots 803. These allow passage of the wash water from the channels into the chamber 201. The slots have guides around their periphery to guide wash water towards the meshes. The insert 801 further has a first recess 805 for receiving the first mesh structure 608 and a recess 806 for receiving the second mesh structure 614. Washing of the meshes is performed from the top down because wash water will fill up the cavity between the outer wall of the separator and the first mesh, and the cavity between the meshes. Washing of the meshes is best performed when the cavities are empty.

Figure 9A:
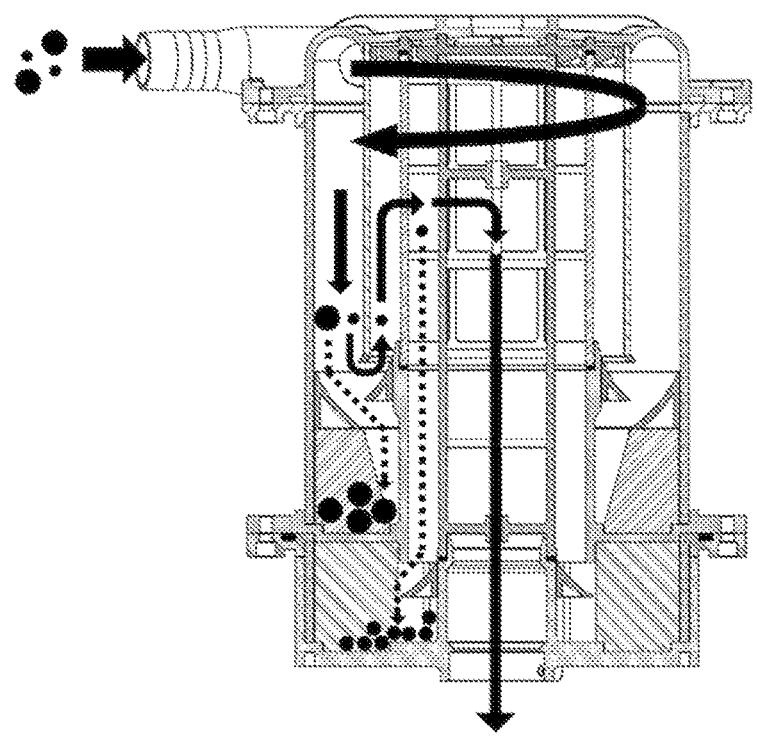
FIG. 9a shows the flow path of effluent through an embodiment.

In use, when a wash cycle is complete and the drain pump drains the drum of the washing machine, effluent enters the inlet 604 and then is fed tangentially into the chamber 605, as shown in FIG. 9a. It then rotates within the chamber, throwing larger debris out to the side, which sinks down into the first sump 612. The effluent then turns sharply under the vortex finder 606, ejecting further debris under inertial action as it does so, which sinks into the first sump 612. The effluent then reaches the first mesh 608 which prevents debris and microfibers of size greater than 400 um from passing therethrough, which either stick to the outside of the mesh or sink down into the first sump 612. The effluent then reaches the second mesh which prevents microfibers of size greater than 50 um from passing therethrough. These either adhere to the outside of the mesh or sink down to second sump 617. When the drum is drained, no more effluent flows into the separator and the liquid level inside the chamber 605 drops, so that only the sumps remain with liquid in them. As the liquid level falls, a certain amount of debris will fall off the meshes and into the sumps.

Figure 9B:
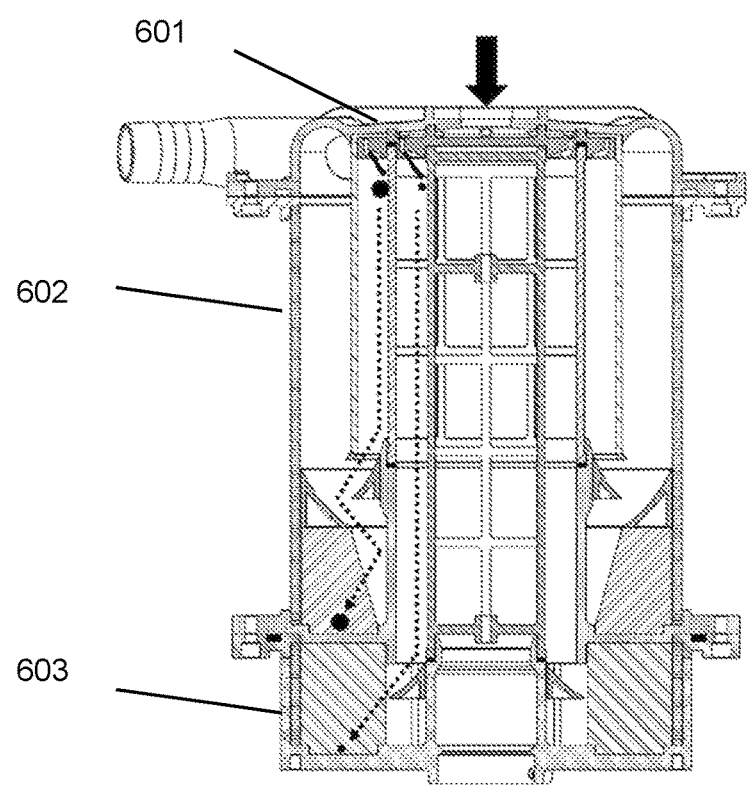
FIG. 9b shows the flow path of wash water through an embodiment.

When the CPU finishes the wash cycle and the drum is drained, the CPU activates the wash fluid inlet valve 405 and the mesh is rinsed with clean mains water. Debris is washed from the outside of the mesh and sinks to the bottom of the chamber, past the ring baffles 209, 210 into the sump. The large arrow in FIG. 9b shows the path of the mains water at the inlet. The smaller arrows in FIG. 9b show the two separate paths the water takes to wash the outside of each mesh structure, removing larger sized debris from the outside of the first mesh and smaller debris including microfibers from the outside of the second mesh.

The process is repeated for subsequent wash cycles.

Eventually the sumps will become full and will need to be emptied. This is performed by removing the end cup 603 as shown in FIG. 9c. The flange 611 and first mesh support structure 607 can then be removed exposing the first sump 612 for emptying and cleaning, as shown in FIG. 9d. The process is reversed for reassembly.

Figure 10:
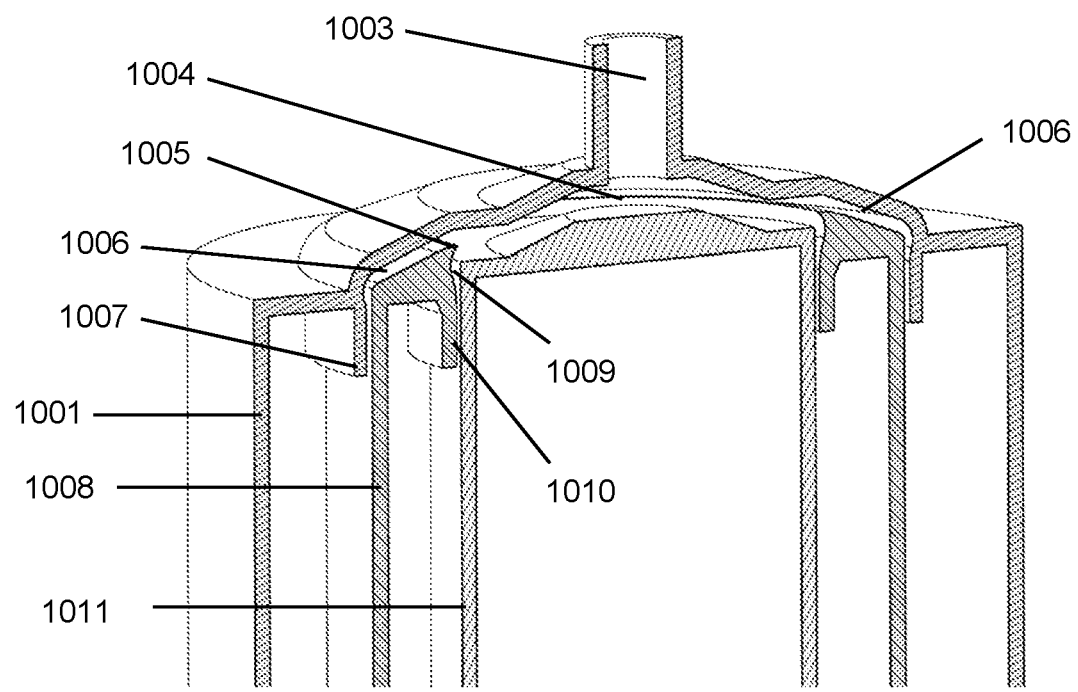
FIG. 10 shows a cross sectional view of an embodiment with wash water guides that are parallel to the meshes and a wash water inlet above the wash apparatus.

In another embodiment, the mesh washing arrangement includes the structure shown in FIG. 10. The outer wall 1001 of the separator terminates in a cap 1002 with a number of internal channels for receiving wash water. An inlet duct 1003 is connected to an upper chamber 1004 to deflect the incoming wash water stream outwards to a stream splitter 1005. The stream splitter 1005 is arranged to split the stream of wash water into two components; a first component directed down a first conduit 1006 leading to a first guide 1007 for guiding the wash water over the outer surface of a first mesh 1008 and a second component directed down a second conduit 1009 leading to a second guide 1010 for guiding the wash water over the outer surface of a second mesh 1011. The conduits 1006, 1009 are disc-shaped, with supports provided to maintain stability. The conduits 1006, 1009 have a decreasing cross-section in order to increase the velocity of the wash water as it approaches the guides 1007, 1010. The guides 1007, 1010 are formed as cylindrical walls spaced apart from the cylindrical first mesh by a distance, for example 1 mm. This arrangement allows the wash water to cascade under force directly down the outside of the meshes 1008, 1011 to remove debris from the outside of the meshes.

Figure 11:
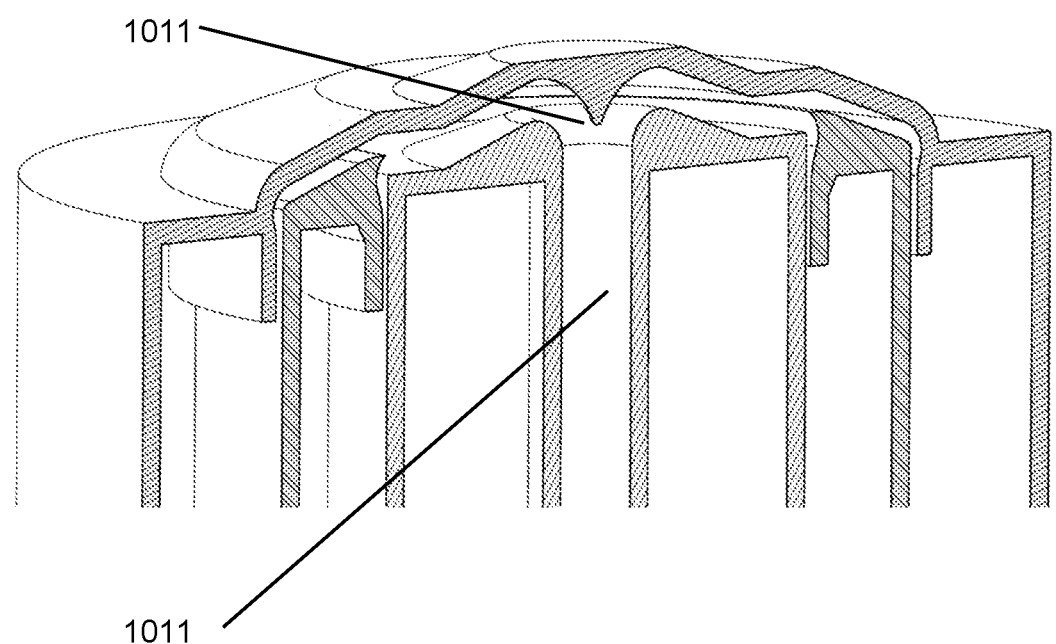
FIG. 11 shows a cross sectional view of an embodiment with wash water guides that are parallel to the meshes and a wash water inlet below the wash apparatus.

In a further embodiment, a mesh washing arrangement as shown in FIG. 11 is provided. The wash water inlet 1101 is located below a deflector 1102. This allows the wash water feed to be routed up inside the separator unit, leaving the top surface clear. This could be useful if the separator unit is mounted externally to a washing machine and underneath a work surface, but needs to be mounted as high up as possible to keep it out of the way. Another reason to mount the separator unit as high up as possible is to allow gravity to drain the unit effectively.

Figure 12:
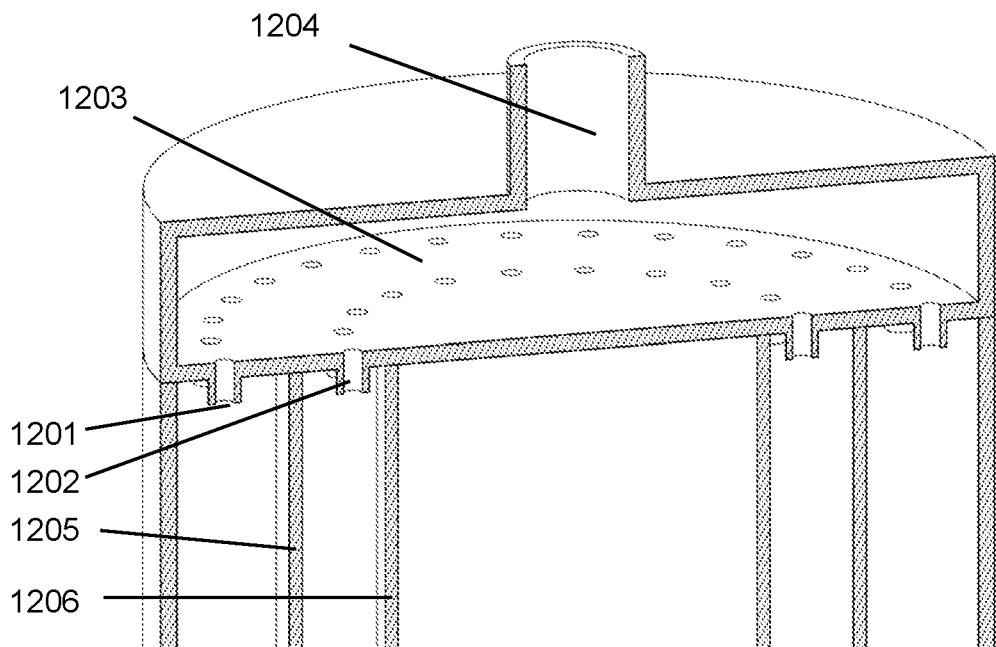
FIG. 12 shows a cross sectional view of an embodiment with two concentric rings of nozzles and a wash water inlet above the wash apparatus.

In a further embodiment, as shown in FIG. 12, the wash apparatus comprises two concentric rings of nozzles 1201, 1202. The nozzles are in communication with a chamber 1203 that is fed by wash water inlet 1204. The nozzles are effectively guides for the wash water, enabling cleaning of the first and second meshes 1205, 1206. Wash water is introduced into the chamber 1203 via inlet 1204 and exits through each nozzle equally to wash the meshes from the top down. Example nozzle dimensions are; a diameter of 0.5 mm, spaced 5 mm apart to achieve a continuous curtain of wash water against the meshes.

Figure 13:
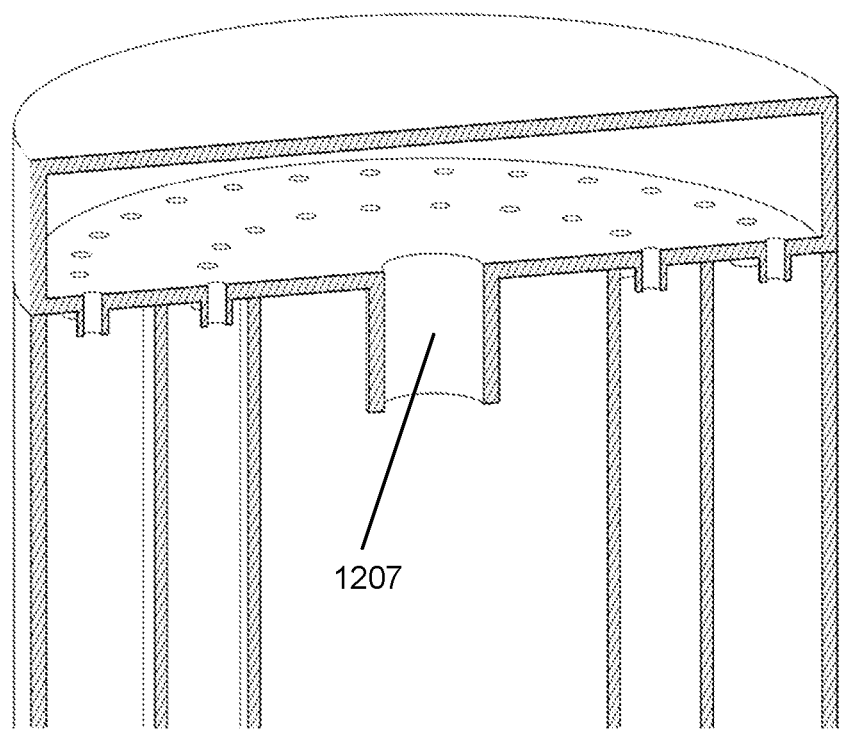
FIG. 13 shows a cross sectional view of an embodiment with two concentric rings of nozzles and a wash water inlet below the wash apparatus.

In an alternative embodiment as shown in FIG. 13, where a wash water inlet 1207 is provided below the nozzles so that the wash water feed is directed up the inside of the separator unit.

Figure 14:
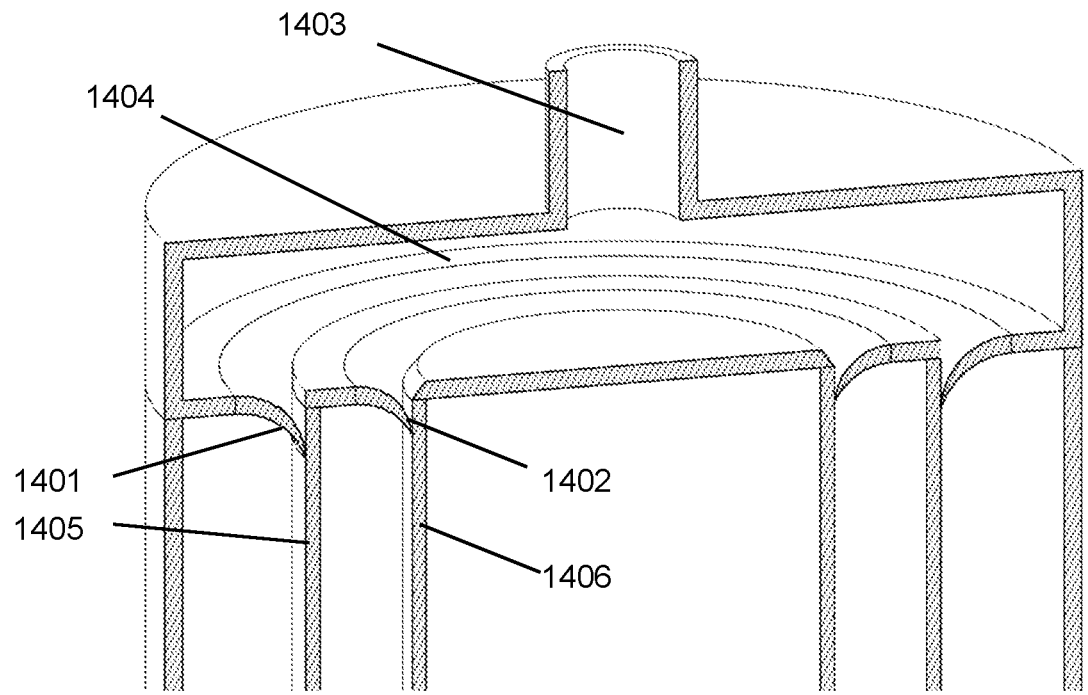
FIG. 14 shows a cross sectional view of an embodiment having guides with or comprising flexible membranes to prevent the flow of effluent back into the guides with the wash fluid inlet above the chamber.

In use, when the effluent in a washing machine drum is drained into the separator unit, the cavity between the outer wall of the separator unit and the first mesh will completely fill with effluent if the drain rate of the washing machine is greater than the flow rate of fluid through the first mesh. Similarly the cavity between the first mesh and the second mesh will completely fill with fluid if the flow rate through the first mesh is greater than the flow rate through the second mesh. In the embodiments described above, it is possible for the effluent to back up through the wash water guides if the cavities completely fill with fluid that can lead to cross contamination between the cavities. FIG. 14 shows an arrangement that prevents effluent from passing back through the wash water guides. In this embodiment, one-way flexible membranes 1401, 1402 are included. The membranes open under the pressure of wash water introduced at the inlet 1403 into chamber 1404 and allow the wash water to forcibly cascade down the meshes 1405, 1406. When no wash water is flowing, the membranes close up and seal the cavities so that no fluid can exit through the guides. The membranes themselves may act as guides to direct the wash water over the meshes.

Figure 15:
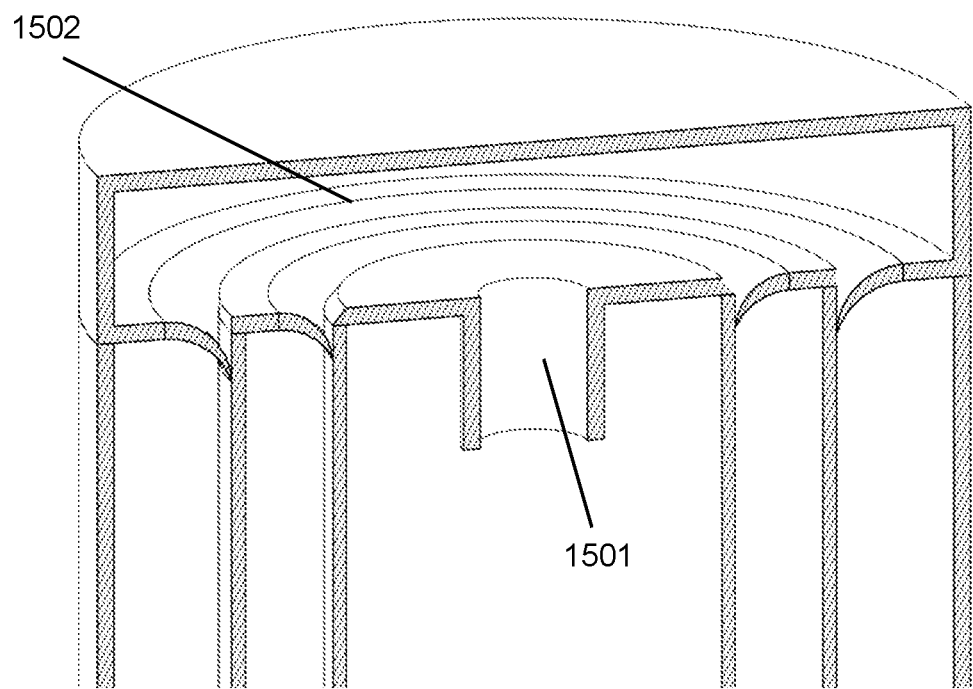
FIG. 15 shows a cross sectional view of an embodiment having guides with or comprising flexible membranes to prevent the flow of effluent back into the guides, but with the wash fluid inlet below the chamber.

FIG. 15 shows the same arrangement as FIG. 14 but with the wash water inlet 1501 below the chamber 1502.

Figure 16:
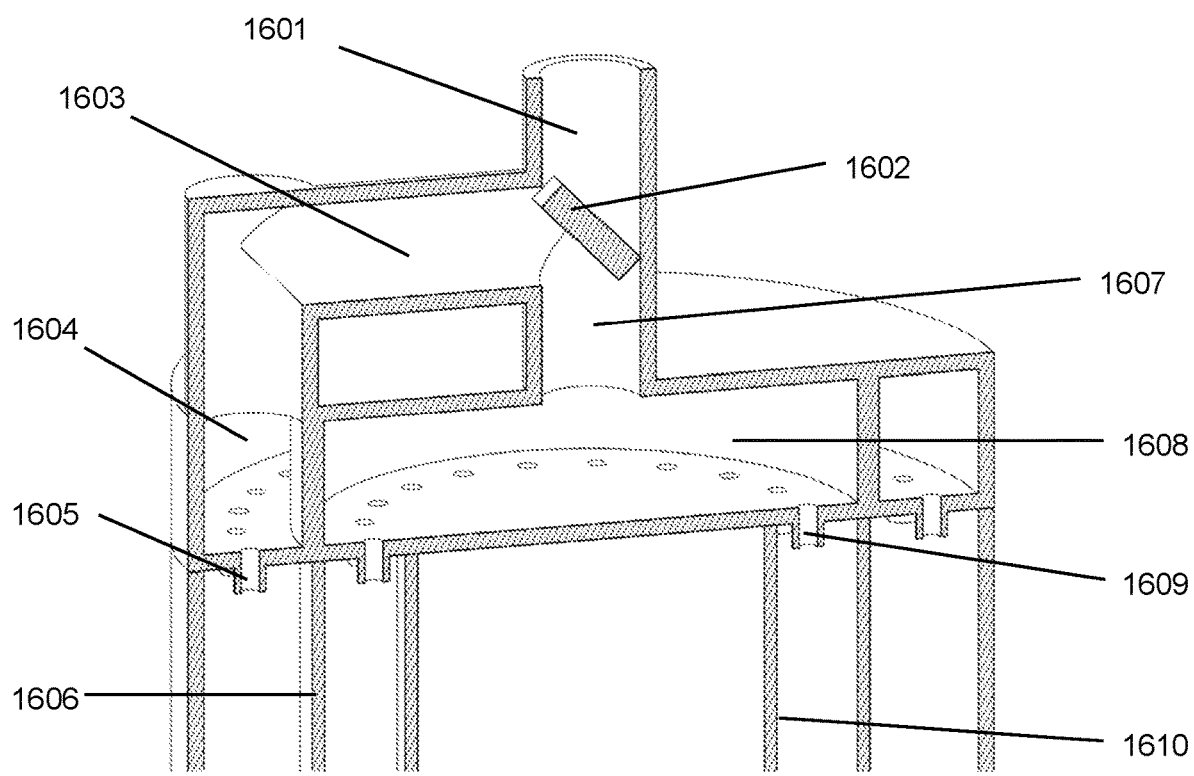
FIG. 16 shows a cross sectional view of an embodiment with two concentric rings of nozzles separated by a two-way valve system that allows two-stage, sequential washing of the meshes.

In a further alternative embodiment the wash water feed to each set of guides is separately controllable. This is shown in FIG. 16. Wash water inlet 1601 is connected to a two-way valve 1602 which can direct the wash water down a first conduit 1603 which leads to a first chamber 1604 above a first ring of nozzles 1605 for washing the first mesh 1606, or down a second conduit 1607 which leads to a second chamber 1608 above a second ring of nozzles 1609 for washing the second mesh 1610. By controlling the valve 1602, the wash water can be sequentially directed to wash the first mesh and then the second mesh. This has the advantage that all of the water pressure at the inlet 1601 is available to wash a single mesh, rather than split between two meshes which improves the ability of the wash apparatus to remove debris from the meshes. This may be particularly important if the mains pressure of the wash fluid is relatively low.

The embodiments shown in FIGS. 11 to 14 have twin meshes but do not include a shroud and baffle arrangement.

The separator may further include a bypass duct, which is a valve-operated system for diverting the flow of effluent around the chamber. If the fluid pressure at the inlet is detected by the sensor to rise above a safe working threshold, this indicates a problem with the separator such as a blockage that could result in a leak. The CPU can then operate the bypass valve to divert the flow of effluent around the separator. Alternatively, the bypass duct could include a passive valve arranged to open when the pressure reaches a threshold value.

The embodiment described above is suitable for installation in a domestic washing machine. However, the separator can be mounted externally to a washing machine so that it can be retrofitted. In this embodiment, the waste outlet of the washing machine is attached to the inlet of the separator 600 and its outlet attached to the waste pipe.

It will be appreciated that the separator disclosed herein can be used for a variety of other appliances and not just for washing machines. It can be used with or for other processing appliances, such as but not limited to driers, such as tumble driers, dyeing machines, cutting machines, recycling machines, dry cleaning machines and so on. The teachings herein could also be used in other industries in which microparticles may be generated as a result of processing of items.

Alternative embodiments include providing a pressurised reservoir for collecting filtered water from the outlet 202 that can be fed into the wash fluid inlet 204 to rinse the mesh.

The flow of effluent may be in the opposite direction, in which case the arrangement of the separator would be opposite too, whereby the coarse mesh would be inside the fine mesh and the wash apparatus would be arranged to wash the inside of the meshes.

It is possible that the wash fluid could be air. Nozzles could be provided in the wall of the chamber so that the entirety of the mesh is washed. The sieve structure could be a perforated barrier of any type, or a membrane, as well as mesh.

Wastewater expelled from textile factories is contaminated with microfibres and it is not guaranteed it will be filtered at municipal facilities. When these facilities exist, they may remove up to 98% of microplastics, however what escapes still equates to millions of microfibres every day. Microfibres removed from water may then be passed to the environment as "sewage sludge", spread on agricultural land as fertiliser. Ultimately microfibres are passed as pollutants into the natural environment—they need to be stopped at source.

Wet-processing factories currently operate in a linear system, whereby microfibre resources are expelled as pollutants from the technical process into the biological environment. Use of the separator system described herein closes the loop into a continued cycle to retain the value of the microfibres within the technical process and stop damage to the biological environment.

An embodiment of the separator system can be retrofitted onto the existing wastewater outlet of wet-processing textile factories to enable microfibre capture at source before pollution of the natural environment can occur.

The separator system can be used to filter microplastics and other micropollutants from environmental drainage systems, such as roadside gullies. A lot of microplastics in the environment break down from larger items of plastic such as car tyres, road surfaces and road markings. After synthetic textiles, tyres are the largest source of microplastics and contain harmful materials such as mineral oils.

Catalytic converters are fitted on most cars and contain highly valuable materials such as platinum, palladium, copper and zinc. During use, small amounts of these metals are lost from cars and fragments are deposited on the road surface. While metal concentrations vary geographically, collection and recycling of these materials not only reduces environmental pollution but can also be a revenue stream in a circular economy.

Typical sewage networks are built along one of two designs:
i) Combined sewers. These collect surface water and sewage together, meaning all waste water passes through a Wastewater Treatment Plant (WWTP). During heavy rainfall, it is common for sewers to overflow, releasing untreated sewage and pollution into waterbodies.
ii) Separate sewers. These discharge surface water directly into waterbodies.

In both systems, roadside runoff, i.e. surface water from the roads, is released into the environment.

Most roadside gullies have drains located at regular points and these drains have a sediment "pot", which lets heavy materials like gravel and sand settle to prevent blockage. These hold some micropollutants, but the majority of microplastics and valuable metals are too small and are not retained.

An embodiment of the separation system of the present invention can be retrofitted as an insert into the sediment pot of a drain to filter micropollutants at source. It is designed to fit existing gullies and to be emptied using a mobile vacuum pump.

The disclosure in the abstract is incorporated herein by reference.

The invention claimed is:

1. A separator for separating microplastics from an effluent comprising:
    a chamber with an inlet and an outlet,
    a sieve structure forming a permeable barrier between the inlet and the outlet and a wash apparatus for washing the sieve structure,
    wherein the sieve structure includes a first mesh having an inlet side and an outlet side within the chamber, such that there is a cavity between the inner wall of the chamber and the sieve structure,
    wherein the wash apparatus includes at least one channel connected to a first set of wash fluid guides located around an edge of the upper part of the chamber for directing wash fluid over the inlet side of the first mesh, and
    wherein the wash fluid guides are provided in a removable cap located at the upper end of the sieve structure, wherein the cap has a wash water inlet and at least one wash water channel connecting the wash water inlet to the wash fluid guides.

2. The separator of claim 1, wherein the sieve structure includes a second mesh within the chamber.

3. The separator of claim 2, wherein the channel is connected to a second set of fixed guides located around an end of the second mesh for directing wash fluid over the second mesh.

4. The separator of claim 1, wherein the guides are slots for directing wash fluid over the first sieve structure.

5. The separator of claim 1, wherein the guides are nozzles for directing wash fluid over the first sieve structure.

6. The separator of claim 2, wherein the guides are arranged in a ring around the meshes.

7. The separator of claim 1, wherein the separator includes a wash fluid valve for controlling the flow of wash fluid into the inlet.

8. The separator of claim 1, comprising a sensor for detecting fluid pressure at the inlet.

9. The separator of claim 8, wherein the sensor is arranged to communicate with a warning system, such that, in use, if the fluid pressure measured by the sensor rises above a first threshold, issuing a warning that the separator needs cleaning.

10. The separator of claim 9, wherein the sensor is arranged to detect when the flow of effluent has ceased or reduced below a threshold and send a signal capable of opening the wash fluid valve.

11. The separator of claim 10, further including a bypass duct between the inlet and the outlet, wherein the bypass duct is engaged by operation of a bypass valve.

12. A processing appliance including a separator of the type claimed in claim 1.

13. The processing appliance of claim 12, wherein the appliance comprises industrial textile manufacturing equipment.

14. A separator of the type claimed in claim 1 for use in a drainage system.

* * * * *